United States Patent
Barsi et al.

(10) Patent No.: US 9,834,364 B2
(45) Date of Patent: Dec. 5, 2017

(54) MOLTEN SALTS INSULATED STORAGE TANK

(71) Applicants: STAMICARBON B.V., Sittard (NL); Enea, Agenzia nazionale per le nuove tecnologie, l'energia e lo sviluppo economico sostenibile, Rome (IT)

(72) Inventors: Adriano Barsi, Rome (IT); Fabrizio Fabrizi, Rome (IT); Walter Gaggioli, Rome (IT); Gaetano Iaquaniello, Rome (IT); Luca Rinaldi, Rome (IT)

(73) Assignees: Stamicarbon B.V., Stittard (NL); Enea, Agenzia Nazionale Per Le Nuove Tecnologie, L'energia E Lo Sviluppo Economico Sostenibilie, Rome (IT)

( * ) Notice: Subject to any disclaimer, the term of this patent is extended or adjusted under 35 U.S.C. 154(b) by 15 days.

(21) Appl. No.: 14/778,251

(22) PCT Filed: Mar. 18, 2014

(86) PCT No.: PCT/NL2014/050161
§ 371 (c)(1),
(2) Date: Sep. 18, 2015

(87) PCT Pub. No.: WO2014/148894
PCT Pub. Date: Sep. 25, 2014

(65) Prior Publication Data
US 2016/0137388 A1     May 19, 2016

(30) Foreign Application Priority Data
Mar. 18, 2013   (EP) .................................... 13159796

(51) Int. Cl.
B65D 81/38     (2006.01)
F28D 20/00     (2006.01)

(52) U.S. Cl.
CPC ..... B65D 81/3809 (2013.01); F28D 20/0034 (2013.01); F28D 2020/0047 (2013.01); F28F 2270/00 (2013.01); Y02E 60/142 (2013.01)

(58) Field of Classification Search
CPC ......... F28D 2020/0047; F28D 20/0034; B65D 81/3809; Y02E 60/142
See application file for complete search history.

(56) References Cited

U.S. PATENT DOCUMENTS 1,950,234 A    3/1934   Ewertz
2,177,369 A   10/1939   Lyon
(Continued)

FOREIGN PATENT DOCUMENTS

DE    43 07 217 A1   9/1994
JP    59-164888      9/1984
(Continued)

OTHER PUBLICATIONS

International Search Report and Written Opinion for PCT/NL2014/050161, dated Jul. 17, 2014, 12 pages.

*Primary Examiner* — Stephen Castellano
(74) *Attorney, Agent, or Firm* — Morrison & Foerster LLP

(57) ABSTRACT

Disclosed is a storage tank for molten salts, preferably of the thermocline type. The tank is provided with an insulation on the inside, which is provided by molten salts captured and retained in an appropriate metal structure. The metal structure has openings allowing molten salts to flow into it, and may consist of metal supports that hold elements which allow retaining molten salts, such as a structured packing, metal boxes, or gutter wall.

12 Claims, 4 Drawing Sheets

(56) References Cited

U.S. PATENT DOCUMENTS

| | | | |
|---|---|---|---|
| 4,158,384 A | 6/1979 | Brautigam | |
| 4,643,212 A | 2/1987 | Rothrock | |
| 2008/0289793 A1* | 11/2008 | Geiken | F24J 2/4649 165/10 |
| 2010/0126706 A1 | 5/2010 | Tsubone et al. | |
| 2010/0301062 A1 | 12/2010 | Litwin et al. | |
| 2011/0271953 A1 | 11/2011 | Wortmann et al. | |
| 2012/0074150 A1 | 3/2012 | Wortmann et al. | |

FOREIGN PATENT DOCUMENTS

| | | |
|---|---|---|
| JP | 2002-048485 | 2/2002 |
| WO | WO-94/20808 | 9/1994 |
| WO | WO-2010/085574 | 7/2010 |

* cited by examiner

MOLTEN SALTS INSULATED STORAGE TANK

This application is the national stage (Rule 371) of international application No. PCT/NL2014/050161 filed Mar. 18, 2014 and claims the foreign priority benefit of European application No. (EPO) 13159796.5 filed Mar. 18, 2013.

FIELD OF THE INVENTION

The invention pertains to a thermal insulating assembly in a storage tank. Particularly, the invention pertains to the storage of molten salts.

BACKGROUND OF THE INVENTION

Molten salts (MS), usually a mixture of nitrates, are known to be used for thermal energy storage in concentrated solar power plants (CSP plants).

In CSP plants, solar energy is captured in a concentrated way by means of mirrors, and made to heat a fluid that serves to produce steam which, in turn, is used to produce electric power by means of a turbine and generator system.

It will be understood that sun radiation is not available continuously. Therefore, the thermal energy recovered from solar radiation during day time, is stored during day and used during night time so as to allow the resulting power to be available at all times.

The most common method to store the captured sun radiation energy is to heat a mass of molten salts, mostly a mixture of nitrates, during the day, while using these hot molten salts, either directly or indirectly, for producing steam and there from electric power. Alternatively, the molten salts used for storing the thermal energy are not themselves heated by sun radiation, but via a different heat transfer fluid that itself is subjected to the solar heating.

The heat storage systems used to store molten salts usually comprises one or more paired tanks (named "hot" and "cold" storage tanks). During molten salts heating, the molten salts are transferred from the cold tank to the hot one. When the heat is recovered, molten salts flow from the hot tank to the cold tank.

As an alternative to the two tank storage system, thermocline storage systems can be used. A thermocline storage tank system is a single-tank system containing both the hot and cold molten salts. This type of system relies on thermal buoyancy to maintain thermal stratification and discrete hot and cold thermal regions inside the tank. Since the density of high temperature molten salts is lower than that of low temperature molten salts, the first volume of high temperature molten salts stratifies on the top of the low temperature molten salts, thus forming a natural interface region extending substantially horizontally. It will be understood that, depending on the relative volumes of the high and low temperature molten salts, this interface moves substantially vertically relative to the storage tank. This system represents an economical alternative to the two-tank storage system.

According to the different CSP plants schemes, the "cold" tank (or the low temperature volume in a thermocline tank) operates within a temperature range varying from 270° C. to 400° C., while the hot tank (or volume) temperature may reach a maximum value of 550° C.

CSP plants are today sized to produce electricity with an electric power output which ranges from 10 MW to 500 MW. Since the efficiency of the power generation system ranges from 30% to 50% and it is requested to produce electricity for 6 or 12 hours when the sun is not available, CPS plants need to store an amount of thermal energy in the range of 100 MWh to 20,000 MWh.

Accordingly a typical storage tank diameter is in the range of 15 m to 50 m, with the tank height being in the range of from 7 m to 18 m. Thus, the overall surface to be insulated typically ranges from 700 $m^2$ to 7000 $m^2$.

It will be understood that it is imperative to minimize heat loss as much as possible, preferably to less than few degrees ° C. per day of the total heat stored. To this end, generally up to 900 mm thickness of external insulation are required (from 350 $m^3$ to 3500 $m^3$ of insulation volume being required). This is a serious burden on the investment in CSP plants. Further, MS tanks employed in CSP plants have several disadvantages and difficulties due to the combined effect of thermal expansion and contraction of the metallic walls. Also, at the bottom of the tank an insulation material is required between the tank and the (normally concrete) foundation, so as to prevent said concrete foundation from reaching too high a temperature.

A background reference is U.S. Pat. No. 4,523,629. Therein a thermocline storage tank for molten salts is provided with an insulated barrier member at the interface region between the hot and cold liquids. Provisions are made (e.g. by correctly selecting the density of the barrier member) so as to make the barrier member float on the lower placed liquid, i.e. so as to allow it to move with the interface between the hot and cold fluids in the tank. Additionally, the document refers to the use of an internal insulation, so as to allow lower cost insulation on the outside. The internal insulation is submerged in the molten salt, and is wetted by it.

Another background disclosure on a molten salts storage tank, is WO 2011/116040. Herein an inner liner is provided that repeatedly expands and contracts during the thermal cycling of the storage system.

A still remaining challenge in the field is to improve the design of storage tanks for molten salts in respect of thermal insulation. This with a view to enabling better operating performance of the materials involved, and in view of enabling lower investment costs.

SUMMARY OF THE INVENTION

In order to better address one or more of the foregoing desires, the invention presents, in one aspect, a storage tank for molten salts, said storage tank comprising an annular metal wall defining a first inner surface and, adjacent to said first inner surface, a metal structure defining a second inner surface, with said second inner surface defining the tank's storage volume for molten salts and wherein an insulation space is present between said first and second surfaces; wherein the second inner surface is provided with one or more openings allowing molten salts to flow from said storage volume into said insulation space, wherein the insulation space comprises a plurality of void spaces.

In another aspect, the invention pertains to a storage tank for molten salts as described hereinbefore, filled with molten salts stored therein, wherein molten salts are retained in said insulation space, preferably in said void spaces.

In yet another aspect, the invention provides the use of molten salts as an internal insulation material for the metal walls of a storage tank for molten salts.

BRIEF DESCRIPTION OF THE DRAWINGS

FIG. 1b depicts an exploded view, along the line A-A indicated in FIG. 1a, of the storage tank of FIG. 1a.

FIG. 2b depicts an exploded view, along the line A-A indicated in FIG. 2a, of the storage tank of FIG. 2a.

FIG. 3b depicts an exploded view, along the line A-A indicated in FIG. 3a, of the storage tank of FIG. 3a.

FIG. 4b depicts an exploded view, along the line A-A indicated in FIG. 4a, of the storage tank of FIG. 4a.

DETAILED DESCRIPTION OF THE INVENTION

Figure 1A:
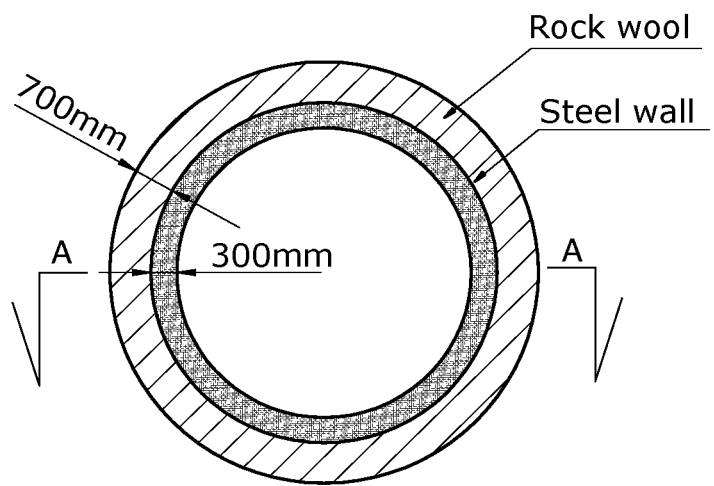
FIG. 1a. depicts a cross section of a storage tank for molten salts according to an embodiment of the invention, wherein the metal structure supports a packing.

In a broad sense, the invention is based on the judicious insight that the hot molten salts themselves are suitable as an internal insulation material for the tank in which they are stored. Further, the invention judiciously provides structures so as to retain an insulating layer of molten salts on the inside of a molten salts storage tank. Thereby the insulation space comprises a plurality of void spaces, which serves to ensure that the molten salts are retained in a stagnant manner, as discussed below.

The invention, in a broad sense, is described with reference to a tank comprising an annular metal wall defining a first inner surface. It will be understood that this, in a straightforward manner, describes a cylindrical tank. The invention is not limited to tanks that are strictly cylindrical, as tanks of a rectangular, elliptical, or spherical design can also be used. In the case of a rectangular tank, the tank in fact has four walls rather than a single annular wall. Nevertheless, for the sake of legibility, the term "annular" is used to describe all sets of walls, in any shape, surrounding the inside storage space of a tank in accordance with the invention. Preferably, the annular wall is the wall of a cylinder, i.e. ring-shaped.

The storage space of the tank is confined by the above-mentioned second inner surface, which is provide by an additional metal structure adjacent to the first inner surface, i.e. the inside of the tank walls. The basic requirement of this structure, is that it is capable of retaining an insulating layer of molten salts against the storage tank walls. To this end, a space is present between the first and second inner surfaces, i.e. effectively between the tank's outside wall and the confinement of the tank's storage space. This space is defined as being an insulation space, indicating that the space can basically have any form as long as it is capable of retaining insulation material (in this case molten salts). Generally, the second inner surface will be substantially parallel with the first inner surface, which results in the insulation space being a substantially annular space. In a storage tank of the aforementioned typical dimensions, this space will preferably have a width of between 10 and 50 cm.

The second inner surface is provided with one or more openings allowing molten salts to flow from the storage space into the insulation space. In the event of a further non-compartmentalized space between the first and second inner surfaces, one opening could be sufficient. Generally, it is preferred to have a plurality of openings divided over the second inner surface, i.e. preferably divided over the volume of the tank. More preferably, if the insulation space is compartmentalized, such as in the event that the insulation space comprises a plurality of void spaces, These separate void spaces, preferably each have at least one opening.

Preferably, the plurality of void spaces is arranged so as to result in a compartmentalization of the insulation space into compartments bordering on, the second inner surface. I.e., the void spaces are divided along the length of the tank's surfaces (or, put otherwise, divided with reference to the length of the tank wall). The void spaces border on the second inner surface, i.e. they are adjacent thereto, or, put otherwise, the insulation space is not a continuum along the length of the wall. This should be understood as follows that, with reference to a vertically positioned tank, the insulation space will not be a single open space, but will have different compartments from bottom to top.

It should be noted that "length" will mean "height" in the most common situation, viz. that of a vertically positioned tank. In a preferred embodiment, the metal structure comprises a plurality of annular supports spaced apart over the length of the wall, said annular supports carrying elements providing the void spaces.

The invention provides several different manners by which a compartmentalized insulation space can be provided. These are discussed with reference to the detailed description of the drawings. The insulation space is designed such that the molten salt retained therein is substantially stagnant. I.e., a flow due to natural convection is limited.

The invention relates to a storage tank for molten salts. In view of the nature of the invention, wherein the molten salts to be stored are also used as an insulation material, it will be understood that the invention preferably pertains to a storage tank in a state actually loaded with molten salts. Thus, preferably, the invention provides a storage tank as described hereinbefore, wherein molten salts are retained in the insulation space, preferably in the void spaces.

Molten salts are generally fluorides, chlorides, nitrites or nitrates. Preferred are nitrates, mostly mixtures of nitrates, and preferably mixtures of sodium nitrate and potassium nitrate. A typical mixture comprises 40 wt. % $KNO_3$, and 60 wt. % of $NaNO_3$. having an average specific heat capacity of 1.50 kJ/kgK, an average density of 1.87 tonnes/$m^3$ at 350° C. and a thermal conductivity of 0.44 kcal/m h° C. (1.84 kJ/m h° C.)

Another typical example is a eutectic mixture of 53 wt. % $KNO_3$, 40 wt. % $NaNO_2$, and 7 wt. % $NaNO_2$.

The present invention is indifferent as to the specific molten salts, and can be applied to any molten salts or, for that matter, any other heat transfer fluids. The latter pertains to fluids generally having a low thermal conductivity.

The present invention can be applied to a storage tank for hot molten salts as used in the paired tanks set-up. Therein, the type of insulation provided by the invention is particularly advantageous for use in the hot tank. Particularly, due to the additional, insulating hot molten salts layer inside the tank wall, the design temperature for the same wall can be reduced with 50° C. to 150° C. as compared to the bulk temperature of the molten salts stored in the tank.

The technical possibility to provide a less stringent temperature design for the walls, brings about cost advantages in terms of wall materials to be selected and wall thickness to be provided. E.g., as compared to a conventional tank, a typical wall temperature will be down from 550° C. to 490° C. in the invention (for a hot tank). It will be understood that the material of which the outside wall is made, serves to provide two functions: structural integrity and resistance to the heat of the molten salt with which it is in contact. The material of the inner wall has less stringent requirements with respect to the structural integrity because molten salt will be present effectively on both sides of the wall. So in effect the inner wall may be of significantly reduced thickness compared to the outer wall. The inner wall may have a thickness of 0.1 to 5 mm, preferably between 0.2-2 mm, more preferably 0.5 to 1 mm. As the inner wall material has to withstand significantly higher temperatures, the reduced wall thickness provides for an overall lower cost.

Even greater advantages are attained in the event of a molten salts storage tank of the thermocline type. For, the tank walls therein not only need to be able to cope with a high temperature (conventionally: 550° C.) but, in view of the moving of the interface between hot and cold molten salts, also to a steep change in temperature from the hot part to the cold part (290° C.) and vice versa. The design of the present invention not only allows the maximum wall temperature to be lower, but it also helps to reduce the temperature swinging from, e.g., 260° C. to 200° C.

In this respect, the invention preferably is a storage tank as described hereinbefore, wherein molten salts are retained in the insulation space, preferably in the void spaces, with the storage tank preferably being of the thermocline type. Accordingly, this thermocline storage tank of the invention comprises hot and cold molten salts, the hot molten salts preferably having a temperature between 450° C. and 550° C. and the cold molten salts preferably having a temperature between 200° C. and 300° C. The molten salts present in the insulation space, preferably in the void spaces, maintain a temperature of 30° C. to 80° C. below the inside bulk temperature of the molten salts.

In addition to the advantages in the design, the reduction of the wall temperature minimizes the stress fatigue of tank wall material.

If used for a thermocline storage tank, the presence of an insulating structure nearby the tank wall minimizes the vertical movement of the thermo-cline layer, to the extent that such is conventionally due to the effect of the differences in hot and cold wall temperature.

By virtue of the internal insulation provided by the invention, a further advantage is that the thickness of the external insulation of the storage tank can be reduced to 20-50% of the thickness used with a conventional design. Alternatively, if prices of the insulation material is of greater interest than the thickness thereof, a cheaper insulation material can be used, not necessarily leading to a lower thickness of the outside insulation layer.

DETAILED DESCRIPTION OF THE FIGURES

FIG. 1a. depicts a cross section of a storage tank for molten salts according to an embodiment of the invention, wherein the metal structure supports a packing. The metal structure comprises a plurality of annular supports. These carry a ceramic structured packing, which has voids capable of allowing hot molten salts to enter.

The insert shows an expanded view of a cross sectional area of the tank where the structural packing is metallic having 300 mm thickness.

Figure 1B:
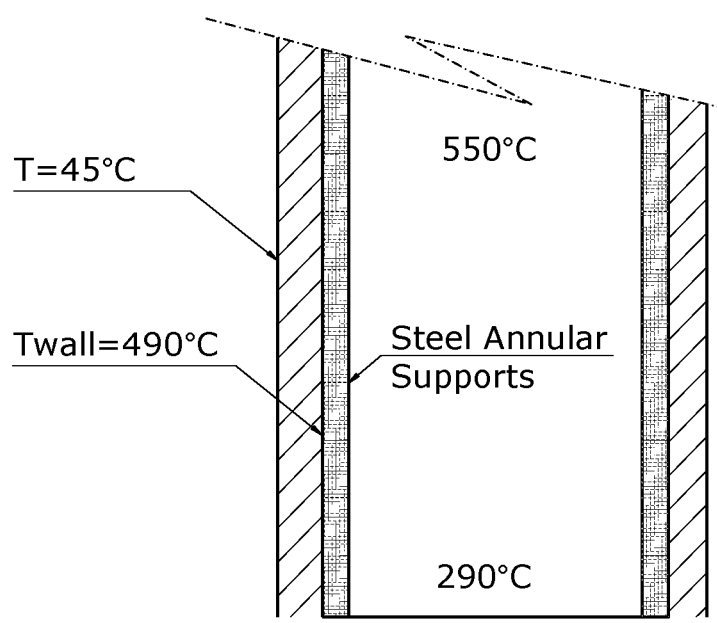

FIG. 1b depicts an exploded view, along the line A-A indicated in FIG. 1a, of the storage tank of FIG. 1a.

Figure 2A:
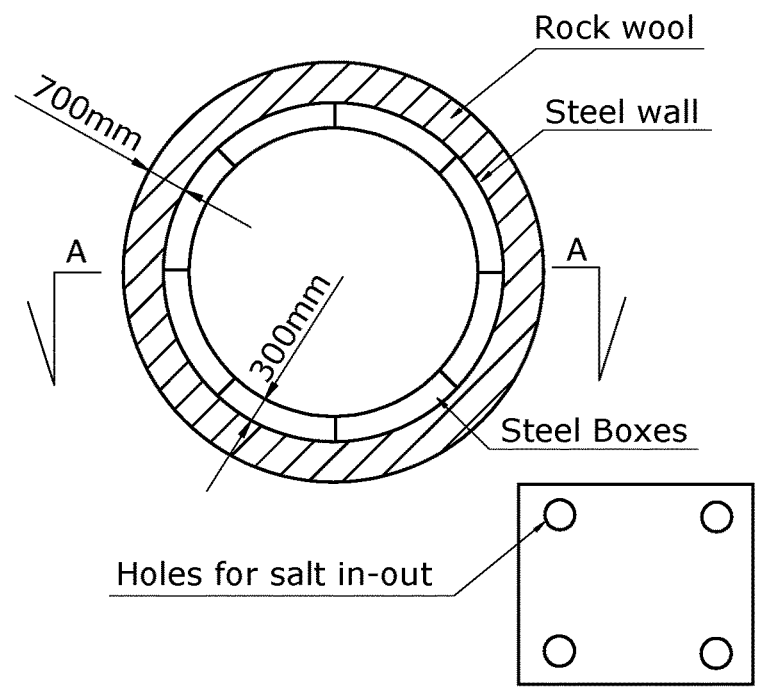
FIG. 2a depicts a cross section of a storage tank for molten salts according to an embodiment of the invention, wherein the metal structure supports steel boxes.

FIG. 2a depicts a cross section of a storage tank for molten salts according to an embodiment of the invention, wherein the metal structure supports steel boxes. The metal structure comprises a plurality of annular supports divided over the length of the wall, each supporting a metal (steel) box. These boxes have openings, preferably holes, for the molten salts to enter. The insert shows an expanded view of the surface of a metal box, having holes.

Figure 2B:
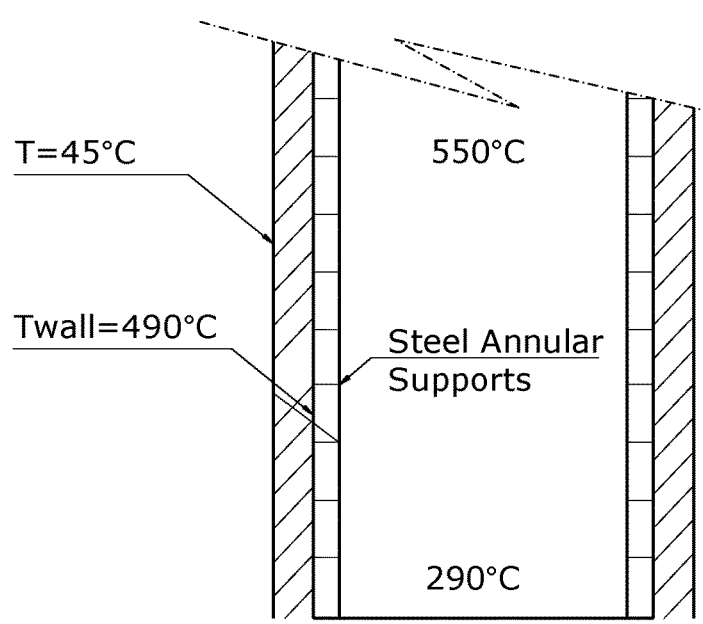

FIG. 2b depicts an exploded view, along the line A-A indicated in FIG. 2a, of the storage tank of FIG. 2a.

Figure 3A:
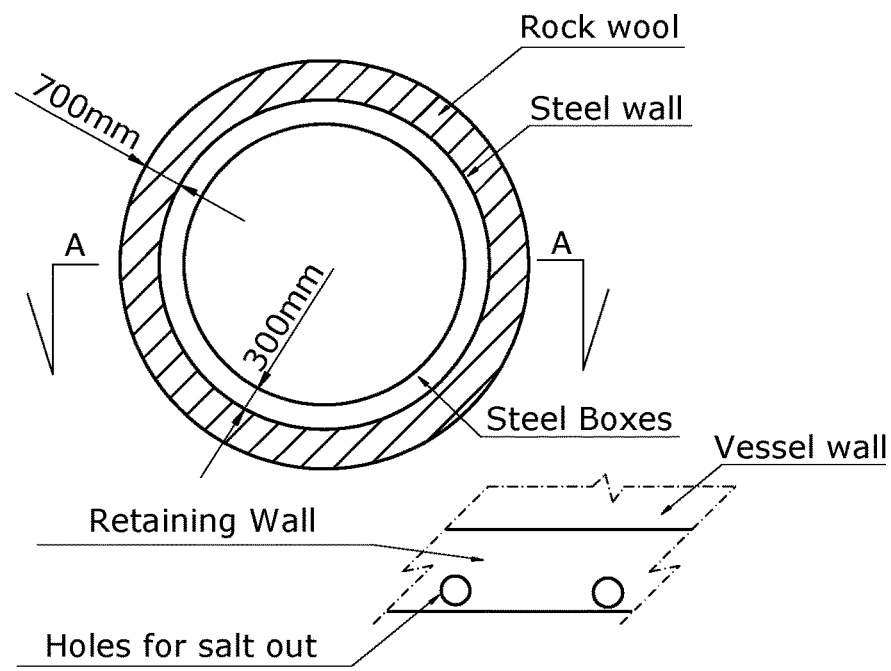
FIG. 3a depicts a cross section of a storage tank for molten salts according to an embodiment of the invention, wherein the insulation space is in the form of gutters.

FIG. 3a depicts a cross section of a storage tank for molten salts according to an embodiment of the invention, wherein the insulation spaces are in the form of gutters. These gutters are formed by extending annular supports, basically as in the aforementioned embodiments. At the end of the supports, straight walls are provided extending upwardly. The openings are present between the upper side of a straight wall, and the next higher support. The insert shows a cross sectional view with an expanded detail of a steel annular support with holes.

Figure 3B:
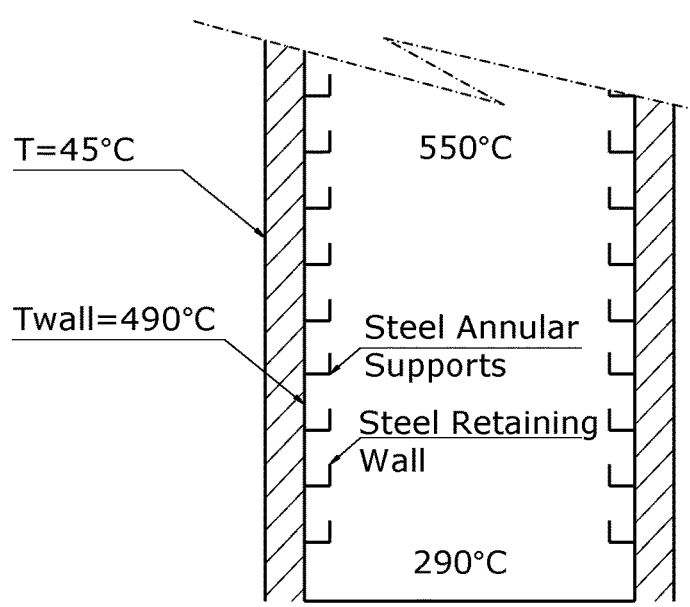

FIG. 3b depicts an exploded view, along the line A-A indicated in FIG. 3a, of the storage tank of FIG. 3a.

Figure 4A:
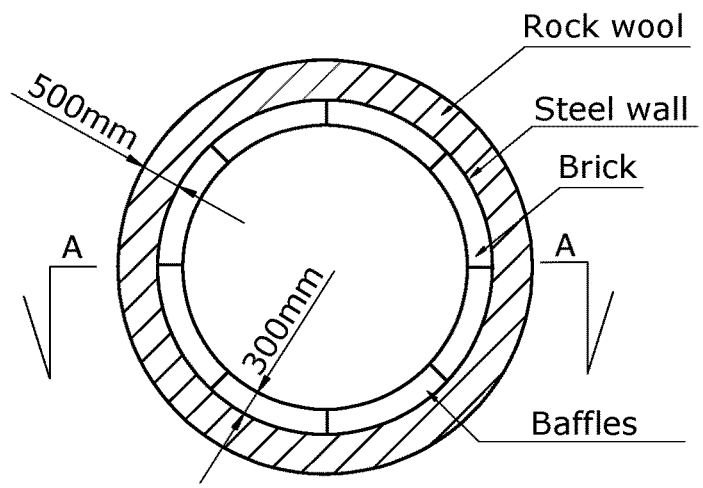
FIG. 4a depicts a cross section of a storage tank for molten salts according to an embodiment of the invention, wherein the metal structure comprises internal baffles that support inert material.
Figure 4B:
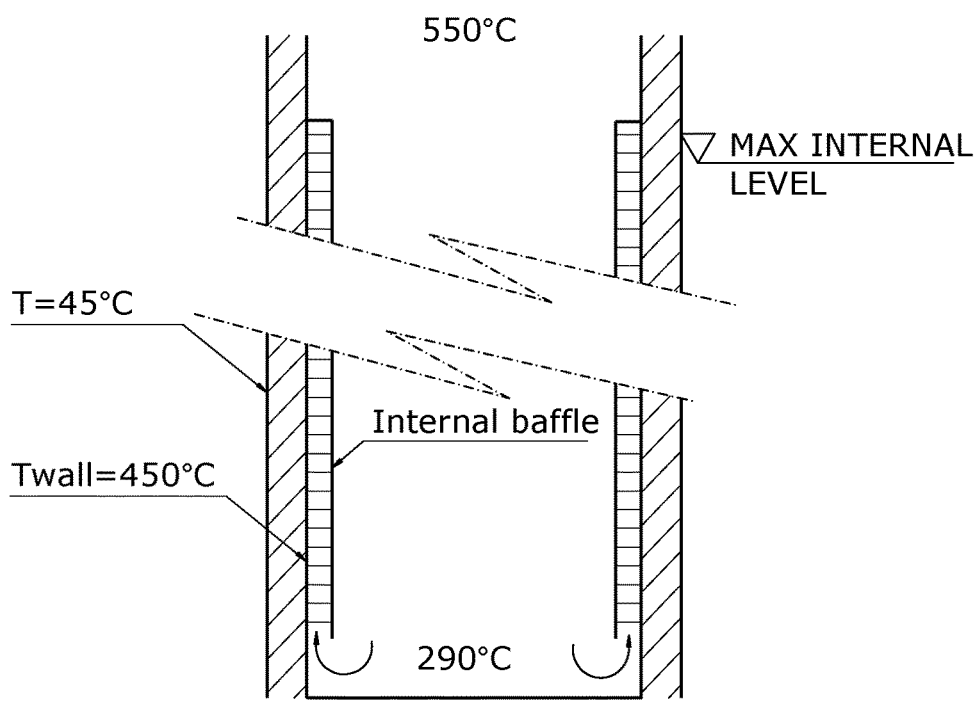

FIG. 4a depicts a cross section of a storage tank for molten salts according to an embodiment of the invention, wherein the metal structure comprises internal baffles that support inert material. The inert material can be, e.g., bricks FIG. 4b depicts an exploded view, along the line A-A indicated in FIG. 4a, of the storage tank of FIG. 4a.

The invention claimed is:

1. A storage tank for molten salts, said storage tank comprising an annular metal wall defining a first inner surface and, adjacent to and substantially parallel to said first inner surface, a metal structure defining a second inner surface, with said second inner surface defining the tank's storage volume for molten salts; and
    wherein a compartmentalized insulation space comprising a plurality of separate void spaces is present between said first and second surfaces;
    wherein the second inner surface is provided with a plurality of openings configured to allow molten salts to flow from said storage volume into said plurality of void spaces in said insulation space;
    wherein the metal structure comprises a plurality of annular supports spaced apart over the length of the wall, said annular supports carrying elements providing the void spaces; and
    (a) wherein the elements are steel boxes, said steel boxes comprising at least one hole for the entry of molten salts; or
    (b) wherein the elements comprise an annular vertical wall positioned on the annular supports, with the vertical walls taken together forming the second inner surface, and the annular supports and vertical walls form a plurality of annular gutters, with the height of the verticals walls being smaller than the distance between two adjacent annular supports.

2. A storage tank according to claim 1, wherein the plurality of void spaces is arranged so as to result in a compartmentalization of the insulation space into compartments bordering on the second inner surface.

3. The storage tank of claim 2 wherein said storage tank is configured for vertical orientation in operation and has a bottom and a top; and
    wherein the insulation space has different compartments from bottom to top.

4. A storage tank according to claim 1, wherein molten salts are retained in said insulation space.

5. A storage tank according to claim 4, being of the thermocline type comprising hot and cold molten salts, the hot molten salts having a temperature between 450° C. and 550° C. and the cold molten salts having a temperature between 200° C. and 300° C.

6. A storage tank according to claim 4, wherein the molten salts are selected from the group consisting of sodium nitrate, sodium nitrite, potassium nitrate, and mixtures thereof.

7. A storage tank according to claim 6, wherein the molten salts are a mixture of sodium nitrate and potassium nitrate.

8. A storage tank according to claim 4, wherein molten salts are retained in void spaces.

9. A storage tank according to claim 1, wherein an inert insulating material is present in said insulation space, in addition to the molten salts.

10. A method to insulate a molten salts storage tank holding molten salts in a storage volume, comprising the following steps:
   (1) provide the storage tank of claim 1; and
   (2) retain molten salts in a stagnant manner in the compartmentalized insulation space of the storage tank.

11. The storage tank of claim 1 wherein the elements are steel boxes, said steel boxes comprising at least one hole for the entry of molten salts.

12. The storage tank of claim 1 wherein the elements comprise an annular vertical wall positioned on the annular supports, with the vertical walls taken together forming the second inner surface, and the annular supports and vertical walls form a plurality of annular gutters, with the height of the verticals walls being smaller than the distance between two adjacent annular supports.

* * * * *